(12) United States Patent
Zuckerman et al.

(10) Patent No.: US 9,317,525 B2
(45) Date of Patent: Apr. 19, 2016

(54) RECONSTRUCTING A STATE OF A FILE SYSTEM USING A PRESERVED SNAPSHOT

(71) Applicant: Hewlett-Packard Development Company, L.P., Houston, TX (US)

(72) Inventors: Boris Zuckerman, Marblehead, MA (US); Vitaly M. Oratovsky, Quincy, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 221 days.

(21) Appl. No.: 13/754,099

(22) Filed: Jan. 30, 2013

(65) Prior Publication Data

US 2014/0214773 A1   Jul. 31, 2014

(51) Int. Cl.
*G06F 7/00* (2006.01)
*G06F 17/30* (2006.01)
*G06F 3/06* (2006.01)
*G06F 11/14* (2006.01)

(52) U.S. Cl.
CPC .......... *G06F 17/30227* (2013.01); *G06F 3/067* (2013.01); *G06F 11/1469* (2013.01)

(58) Field of Classification Search
CPC .......... G06F 17/30088; G06F 11/1464; G06F 11/1469; G06F 17/3023; G06F 11/1448; G06F 2201/84; G06F 3/067
USPC .................... 711/114, 162; 707/639, 674, 684
See application file for complete search history.

(56) References Cited

U.S. PATENT DOCUMENTS

| | | | |
|---|---|---|---|
| 5,870,758 A * | 2/1999 | Bamford et al. | |
| 6,591,264 B1 * | 7/2003 | Humlicek | |
| 6,771,843 B1 * | 8/2004 | Huber | G06F 11/1448 382/305 |
| 6,782,389 B1 | 8/2004 | Chrin et al. | |
| 7,430,570 B1 | 9/2008 | Srinivasan et al. | |
| 7,546,319 B1 | 6/2009 | Srinivasan et al. | |
| 7,650,341 B1 | 1/2010 | Oratovsky et al. | |
| 7,716,183 B2 * | 5/2010 | Lee | G06F 3/0605 707/639 |
| 8,010,493 B2 * | 8/2011 | Anderson et al. | 707/638 |
| 8,135,678 B1 | 3/2012 | Chen et al. | |
| 2002/0178146 A1 * | 11/2002 | Akella | G06F 11/1471 |
| 2007/0239798 A1 * | 10/2007 | Shringi et al. | 707/201 |
| 2008/0126699 A1 * | 5/2008 | Sangapu et al. | 711/114 |
| 2008/0177957 A1 * | 7/2008 | Lee | 711/161 |
| 2008/0256311 A1 * | 10/2008 | Lee | 711/162 |
| 2010/0257403 A1 * | 10/2010 | Virk et al. | 714/15 |

(Continued)

OTHER PUBLICATIONS

Implementing TimeFinder Multiple Snapshots with Virtual Provisioning for Oracle 11g Databases on EMC Symmetrix VMAX, <http://www.emc.com/collateral/software/white-papers/h5635-timefinder-snap-multiple-snapshots-wp.pdf>, Jan. 2011.

(Continued)

*Primary Examiner* — Cheyne D Ly
(74) *Attorney, Agent, or Firm* — Trop, Pruner & Hu, P.C.

(57) ABSTRACT

A technique includes receiving a request to restore a state of a file system. The request defines a rollback period, which extends from a restoration time that is specified by the request to a time at which the request was made. The technique includes reconstructing a state of the file system in response to a query using a preserved snapshot of the file system. The reconstruction including reconstructing the state at an arbitrary query time based at least in part on a dynamically inheritable attribute of an entity stored on the file system and the rollback period.

21 Claims, 10 Drawing Sheets

(56) References Cited

U.S. PATENT DOCUMENTS

2012/0030261 A1    2/2012  Mason et al.
2012/0303585 A1*  11/2012  Zuckerman et al. .......... 707/649
2014/0089264 A1*   3/2014  Talagala et al. ............... 707/649

OTHER PUBLICATIONS

Mankude, H., Snapshots for HDFS, < http://hortonworks.com/blog/snapshots-for-hdfs/ >, Feb. 2, 2012.

* cited by examiner

RECONSTRUCTING A STATE OF A FILE SYSTEM USING A PRESERVED SNAPSHOT

BACKGROUND

Data stored in a storage system can be organized into files and directories of a file system. A large storage system typically has a large number of computer nodes. As a result, information associated with the file system can be a distributed across the computer nodes. Performing certain operations in a distributed file system can be complex and can result in inefficiency if not performed properly.

DETAILED DESCRIPTION

Figure 1:
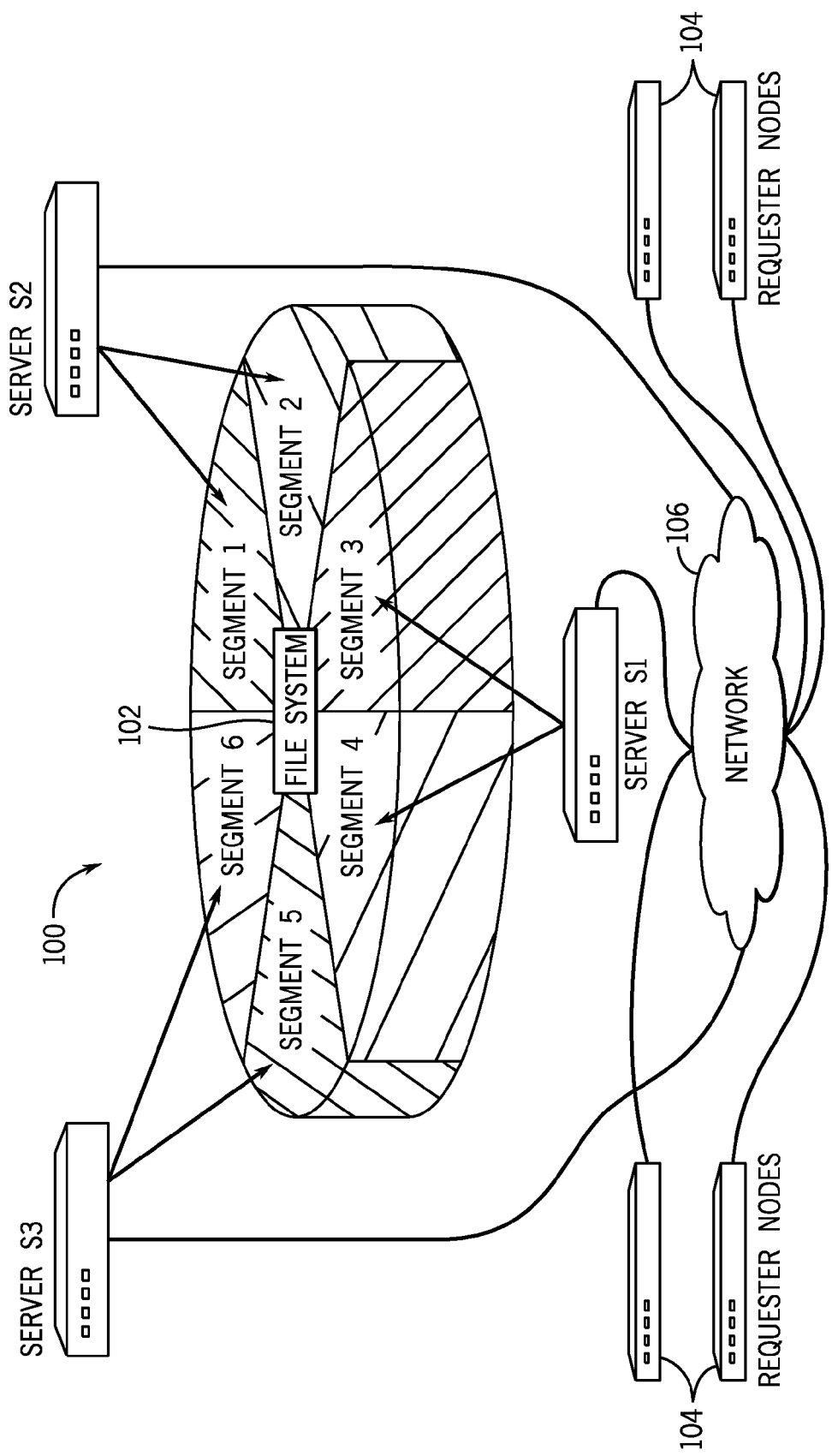
FIGS. 1, 2, and 5 are schematic diagrams of distributed storage systems according to example implementations.

FIG. 1 illustrates a distributed storage system 100 that includes a distributed file system 102. The distributed file system 102 is divided into multiple logical segments (identified as segments 1-6 in the example of FIG. 1). Multiple server computers (e.g., server S1, server S2 and server S3), which are part of the distributed storage system 100, manage respective groups of the segments. For example, server S1 manages segments 3 and 4, server S2 manages segments 1 and 2, and server S3 manages segments 5 and 6. The number of segments managed by each respective server can vary and can change over time. As used here, the term "segment server computer" or "server" refers to any computing entity that manages one or multiple segments.

A "segment" typically includes data in a contiguous range of a storage medium, up to some predefined maximum size. A "segment" is used to maintain a collection of file system entities, including inodes (file system entities can be in the form of files, parts of files, and directories). A first segment can refer to file system entities (e.g. files and/or directories) in another segment.

Each segment server (S1, S2, or S3) is responsible for allocation of blocks and inodes within the boundaries of the respective individual segment managed by the respective segment server. A file system entity includes one or multiple blocks of data, where each block is a predefined region of storage. An inode is a data structure that stores information about a file system entity, such as a file or directory. Examples of information contained in an inode include the following information regarding the respective file system entity: type, length, access and modification times, location on a storage medium, owner, permissions, etc. Note that an inode does not contain the actual data of the corresponding file system entity (e.g. the inode for a file does not contain the data for the file).

The amount of storage that is "owned" by a segment server can be controlled. By allocating specific number(s) of segments to a segment server, an amount of storage owned by the segment server corresponds to a number of file system entities that the segments server controls. The division of a distributed file system into served segments that are associated with respective segment servers allows for the distributed file system 102 to scale linearly. As more segments added to the file system 102, correspondingly more segment servers can also be added. Additionally, network entry points to the segment servers can also be increased correspondingly.

Although three segment servers (and associated six segments) are shown in FIG. 1, note that an actual distributed storage system can include a much larger number of segment servers and respective segments. For example, the distributed file system 102 can include thousands of segments. In some examples, at any given time, each individual segment is exclusively controlled by a corresponding one segment server. For load balancing and/or fault tolerance, the control of any given segment can be migrated from one segment server to another segment server.

FIG. 1 further depicts various requester nodes 104 that are coupled over a data network 106 (e.g. local area network, storage area network, wide area network, public network, etc.) to the servers S1, S2, and S3. Examples of the requester nodes 104 include client computers (e.g., desktop computers, notebook computers, etc.) associated with users. Alternatively, the requester nodes 104 can include segment servers that have to retrieve data served by other segment servers in the distributed file system 102.

A challenge posed by a large or complex distributed storage system is that management tasks can be relatively complex, and can lead to inefficiency if appropriate measures are not taken. As examples, a distributed storage system can provide for data protection by taking snapshots of data stored in the distributed system. A "snapshot" is a representation of data stored in the distributed system at a particular point in time. Thus, multiple snapshots of data can be taken at respective points in time. A snapshot can be taken of an entire file system, or some portion less than the entirety of the file system (e.g. snapshot of a particular directory, including any files or sub-directories in the particular directory). If data failure or loss were to occur, then the distributed storage system can use selected one(s) of the snapshots to recover data, depending on how far back in time a user or application wishes to recover data.

In a distributed storage system such as that shown in FIG. 1, the proliferation of snapshots results in information associated with such snapshots being distributed across many different servers, including the servers S1, S2, S3 as well as the requester nodes 104. Coordination of such distributed information associated with snapshots is challenging and can be time-consuming.

In accordance with some implementations, techniques or mechanisms are provided to improve efficiency in managing snapshots or other objects in a distributed storage system. In some examples, dynamic inheritance is employed, where dynamic inheritance involves use of dynamically inheritable attributes. A dynamically inheritable attribute is considered to be "dynamic" in the sense that the attribute is calculated at run-time of the distributed storage system—in other words, a value of the dynamically inheritable attribute is set at run-time of the distributed storage system, rather than being statically set. In the context of snapshots, the dynamically inheritable attribute can include a time property of the snapshot. The dynamically inheritable attribute is considered to be "inheritable" in the sense that the attribute is propagated among two or more than two hierarchical file system entities.

In alternative examples, dynamically inheritable attributes can also be associated with other types of objects of a distributed storage system, such as replication policies, placement rules, information that tracks changes, security rules, audit policies, and so forth. A replication policy specifies the number of replicas to make of file system entities (or groups of file system entities). A placement rule specifies where a new file system entity is to be placed in the storage system. Information that tracks changes includes information that tracks changes made to selected file system entities. A security rule specifies security to be applied to selected file system entities. An audit policy specifies information to be associated with file system entities to allow for later audit. Dynamically inheritable attributes associated with any of the foregoing objects can be set at run-time of the storage system and can be propagated among file system entities.

In addition to providing dynamically inheritable attributes as discussed, performance of the distributed storage system can be enhanced by using validation procedures that validate attributes of related file system objects in a more efficient manner, as discussed further below.

Figure 2:
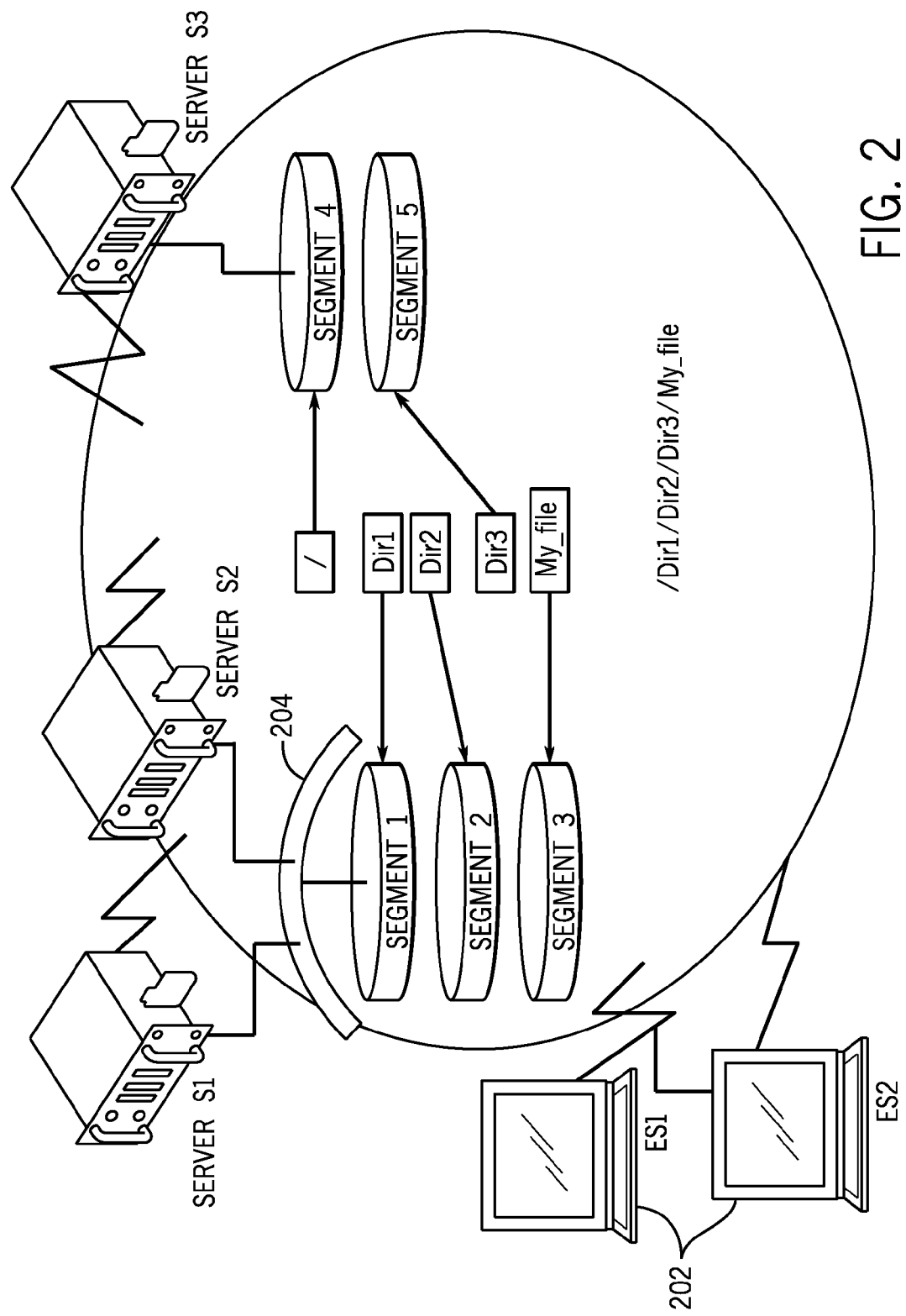

As further shown in an example arrangement in FIG. 2, the various computing entities depicted in FIG. 1 can be classified as being destination servers (DS) or entry point servers (ES). Certain computing nodes can be both destination servers and entry point servers. In the example of FIG. 2, servers S1, S2, and S3 can be both entry point servers and destination servers. However, computing nodes 202 (which can correspond to the requester nodes 104 shown in FIG. 1) are considered entry point servers (ES1 and ES2 in the example of FIG. 2).

A destination server (also interchangeably referred to as a "segment server") serves as a final destination for management of files, directories, or other file system entities. The destination servers manage respective sets of segments. For most file system operations, entry point servers send requests to destination servers to perform respective operations. The association between segments and destination servers is made available to computing nodes (such as entry point servers) that are able to access the distributed file system.

A destination server can be connected to segments directly or through a network 204, which can be implemented with one or some combination of: Fibre Channel (FC) interconnects, Internet Small Computer System Interface (iSCSI) interconnects, serial attached SCSI (SAS) interconnects, or other types of interconnects. An entry point server can run applications or provide access to the distributed file system through protocols such as the Network File System (NFS) protocol, Server Message Block (SMB) protocol, Hypertext Transfer Protocol (HTTP), File Transfer Protocol (FTP), and so forth.

The distributed file system implemented with the arrangement shown in FIG. 2 is a hierarchically-arranged file system. A "hierarchically arranged file system" refers to a file system that includes file system entities at different levels in a hierarchy. The hierarchy includes a file at the lowest level, and directories at various intermediate levels and the root level. To achieve a high degree of parallelism, individual entities of the hierarchically arranged file system can be widely distributed across many segments that are correspondingly controlled and served by different destination servers.

For example, as shown in FIG. 2, a file path /Dir1/Dir2/Dir3/My_file indicates that the file My_file is located in a directory Dir3, which in turn is located in directory Dir2, which in turn is located in directory Dir1, which in turn is located under the root directory /. This example path name represents file system entities at five different hierarchal levels, where My_file is at the lowest hierarchal level, while the root / is at the highest hierarchal level.

FIG. 2 illustrates how individual elements of the file My_file associated with the path name /Dir1/Dir2/Dir3/My_file are placed in five different segments (segments 1-5) shown in FIG. 2, and controlled or served by three different destination servers (S1, S2, and S3). To execute an operation with respect to the file My_file, an entry point server may have to request services of various destination servers that control respective segments associated with the entities (/, Dir1, Dir2, Dir3, My_file) in the path name /Dir1/Dir2/Dir3/My_file.

As another example, an entry point server performing the creation of a new file may decide to place the new file in segment 5, and may have to register the new file's name in directory Dir2 in segment 2. In this case, the entry point server making the new file creation request requests services of destination server S3 to create the new file and services of destination server S2 to link the file into directory Dir2. Other file system operations may involve more file system objects or more segments, and thus may involve an even greater degree of coordination among the larger number of destination servers. However, the fundamental idea behind scalability in such highly parallel distributed file system environment is in reducing the scope of individual operations to a few objects and few servers.

A snapshot taken in a distributed storage system such as depicted in FIG. 1 or 2 can present special challenges due to having to proliferate snapshot-related information throughout all the servers controlling the file system entities of a sub-tree that is the subject of the snapshot. A "sub-tree" refers to any portion of the distributed file system that is stored in the distributed storage system to which request to take a snap is applied. For example, a "sub-tree" can include file system entities (files and directories) under directory Dir2 in FIG. 2. Another "sub-tree" can include file system entities under the root directory /. A snapshot of a sub-tree refers to a point-in-time copy of the sub-tree.

Snapshots by their nature affect the state of multiple objects. In some cases, the number of objects affected can number in the thousands or even millions.

In addition, as with any other operation, a snapshot is initiated at an entry point server, so that only the entry point server and a destination server for a snapped directory know that a snap event (to take a new snapshot) has occurred. Destination servers for all other objects that belong to a snapped sub-tree may not be aware that a snap event has occurred. In accordance with some examples, information pertaining to a snapshot is propagated to objects that are part of the hierarchy associated with the sub-tree that is being snapped.

To be able to propagate relatively rapidly information of snapshots, dynamic inheritance according to some implementations is provided. Dynamically inheritable attributes associated with snapshots are calculated or revalidated when they are to be used. In accordance with some implementations, an entry point server is responsible for propagating dynamically inheritable attributes down a file system hierarchy at run-time, and revalidating the dynamically inheritable attributes when appropriate. In cases when destination server actions depend on values of dynamically inheritable attributes, an entry point server is able to pass the values of the dynamically inheritable attributes to destination server(s) as parameters in messages, such as in RPC (remote procedure call) messages.

Different implementations may employ different ways to identify snapshots. For instance, a snapshot can be identified by a name of a mount point (name of a physical location used as a root), by a special alternative file name space accessible through a special hidden directory, by a restoration point, and so forth. Regardless of how snapshots are identified, the time property (time when a snapshot was requested or created) is an important characteristic of a snapshot. In the ensuing discussion, the time property of a snapshot is referred to as a snapshot time mark (STM), which can be recorded with any file system entity. An STM is propagated as a dynamically inheritable attribute in some implementations. The rule of propagation for STM is based on the fact that time (STM) moves in one direction and effective STMs for snapshots grow monotonically. Therefore, the effective STM for an object is the largest value of inherited from the parent and its own.

Figure 3:
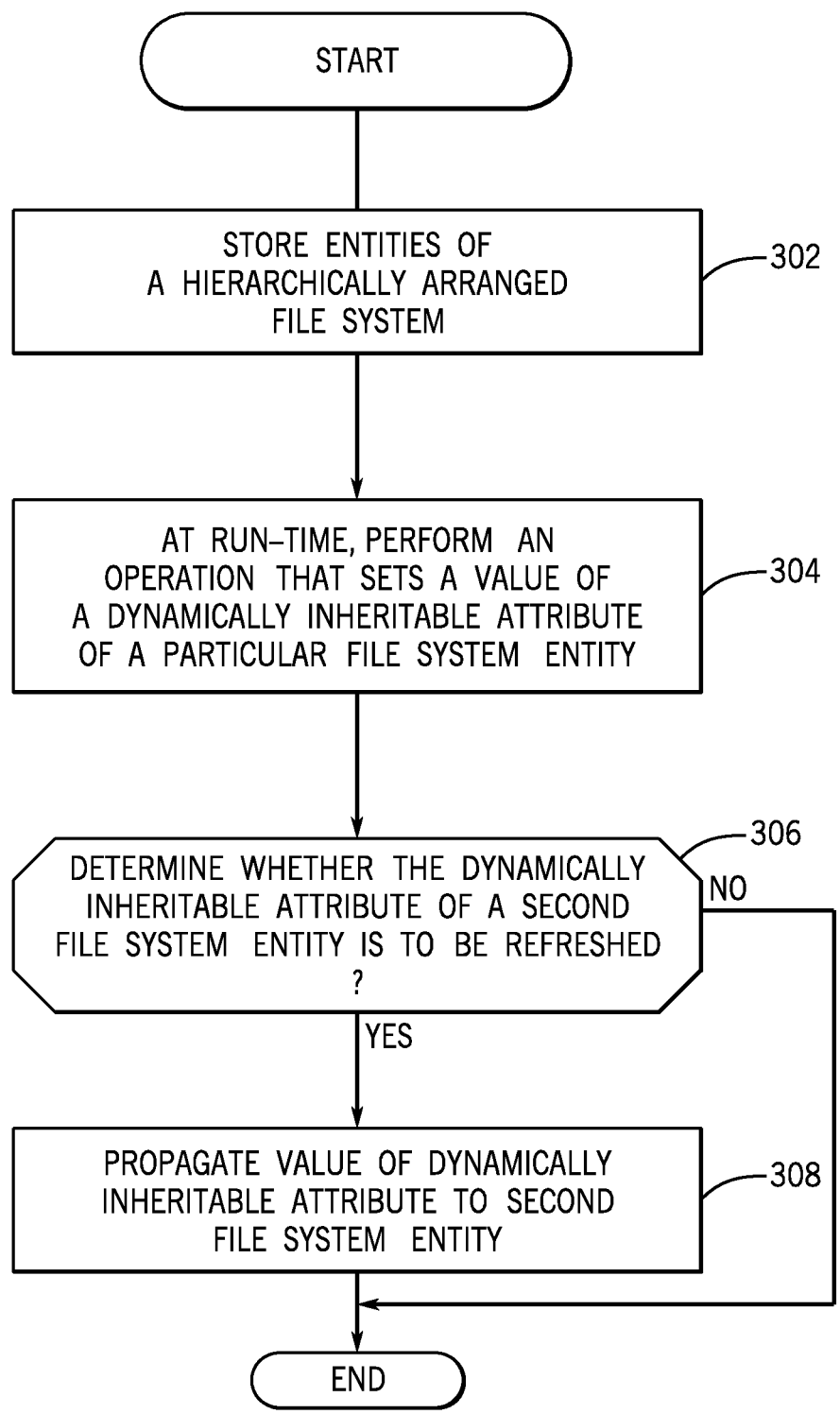
FIGS. 3, 4, and 6 are flow diagrams of processing techniques performed in a distributed file system according to example implementations.

FIG. 3 is a general flow diagram for handling dynamically inheritable attributes in a storage system, according to some implementations. Entities of a hierarchically arranged file system are stored (at 302) in the distributed storage system. At run-time of the file system, an operation is performed (at 304) that sets a value of a dynamically inheritable attribute of a particular one of the file system entities. For example, the dynamically inheritable attribute can be an STM discussed above. In other examples, other types of dynamically inheritable attributes include a replication policy, a placement rule, information relating to tracked changes, a security rule, an audit policy, and so forth.

The process of FIG. 3 next determines (at 306) whether the dynamically inheritable attribute of at least a second one of the file system entities related to the particular file system entity (e.g. the file system entity is a descendant of the particular file system entity) is to be refreshed. In response to determining that the dynamically inheritable attribute of at least the second file system entity is to be refreshed, the value of the dynamically inheritable attribute is propagated (at 308) to at least the second file system entity.

The determination that a dynamically inheritable attribute of a file system entity is to be refreshed can be part of a validation procedure, in which the value of the dynamically inheritable attribute for a given file system entity is validated. For example, a validation procedure can be performed of all file system entities along a particular path from a particular file system entity. For performance reasons, techniques or mechanisms according to some implementations are provided to intelligently determine that certain file system entities along the path do not have to be re-validated provided certain conditions are satisfied, as discussed further below. A goal of techniques or mechanisms according to some implementations is to avoid traversing the entire chain of nodes (corresponding to a sub-tree of file system entities) during a validation procedure.

In some implementations, a dynamically inherited generation (dm_gen) field in an in-core (also referred to as in-memory) inode representing a file system entity is used during a validation procedure to determine when traversal of a chain of nodes can be stopped. The dm_gen field is maintained by entry point servers in in-core inodes and is copied from the parent of the inode during the process of propagation of a dynamically inheritable attribute (e.g. an STM). The dm_gen field is updated at the root of the file system whenever a dynamically inheritable attribute is updated, such as in response to taking of a new snapshot.

The dm_gen field is changed (e.g. monotonically incremented) at the root of the file system with respective changes of the corresponding dynamically inheritable attribute (e.g. STM). The dm_gen field is propagated from the root to other nodes during lookups or during a validation procedure to validate the dynamically inheritable attribute (e.g. STM).

Figure 4:
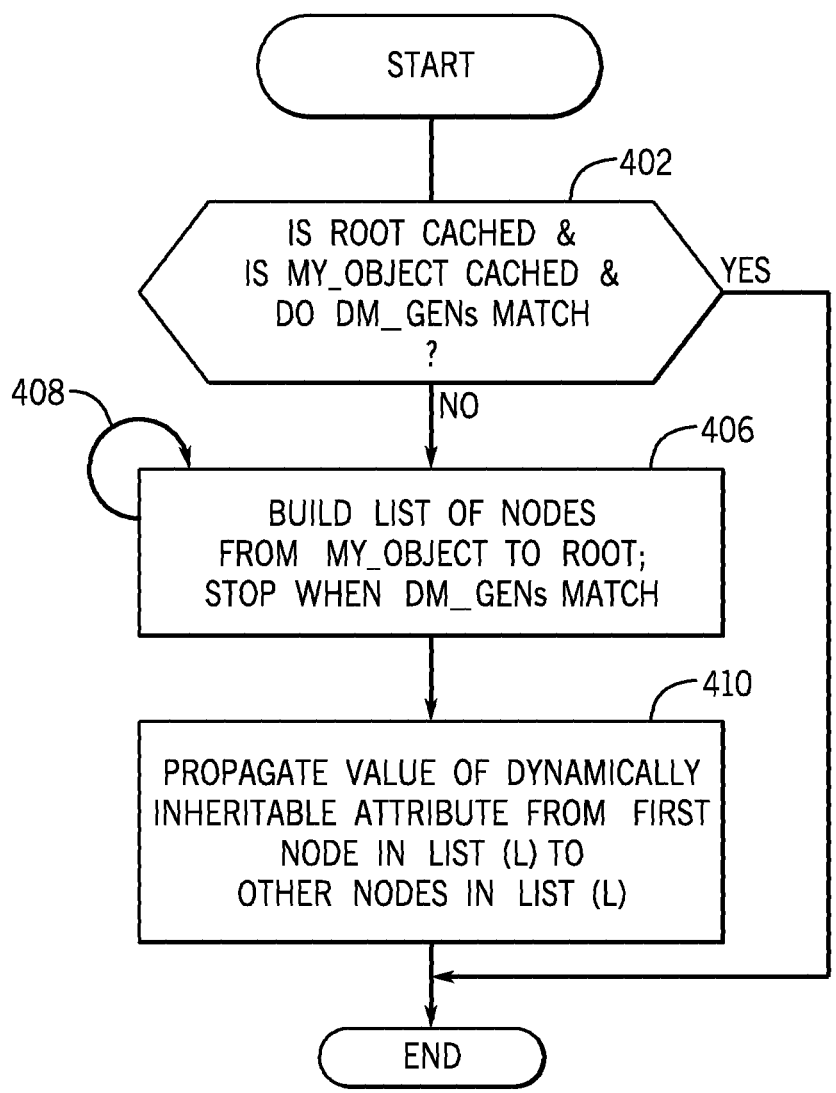

FIG. 4 depicts a process of propagating a dynamically inheritable attribute (e.g. STM) during a validation procedure. The validation procedure of FIG. 4 is performed by an entry point server and is used to validate a dynamically inheritable attribute (e.g. STM) at a given file system entity, referred to as "my_object in FIG. 4.

The process of FIG. 4 checks (at 402) for certain predefined conditions. The predefined conditions include: (1) whether the root of the file system is cached at the entry point server, (2) whether the given file system entity being validated (my_object) is cached, and (3) whether the dm_gen field of the root is the same as the dm_gen field of the given file system entity (my_object). If all three conditions checked at 402 are true, then the process of FIG. 4 can exit (at 404), since the dm_gen field of my_object is the same as the dm_gen field of the root, which means that the dynamically inheritable attribute of my_object is up-to-date (at the given file system entity, my_object) and does not have to be refreshed. Stopping the validation of the dynamically inheritable attribute (e.g. STM) once it is confirmed that the dm_gen field of the file system entity being checked is the same as the dm_gen field of the root allows for more efficient validation, since time and resources are not wasted in trying to validate the dynamically inheritable attribute that is already refreshed.

On the other hand, if any of the conditions checked for at 402 is not true, then the process proceeds to task 406. Note that if the root is not cached or if my_object is not cached, then the corresponding dm_gen field is not locally accessible at the entry point server. The entry point server builds (at 406) a list (L) of all nodes in the hierarchy from my_object to the root. As part of the process of building the list (L), the entry point server retrieves the root from the corresponding destination server (unless such information is already cached at the entry point server) and retrieves information pertaining to my_object from the corresponding destination server (unless such information is already cached at the entry point server). Moreover, the entry point server further retrieves information pertaining to any intermediate file system entities between my_object and the root (unless any such information associated with a given intermediate object is already cached at the entry point server).

Nodes associated with file system entities in the hierarchy are iteratively added (at 408) to the list (L) so long as the dm_gen field of the corresponding file system entity does not match the dm_gen field of the root. The adding of nodes to the list (L) stops when the dm_gen field of a corresponding file system entity matches the root's dm_gen field.

After the list (L) has been built (at 406, 408), the value of the dynamically inheritable attribute (e.g., STM) is propagated (at 410) from the first node in the list (L), where the first node is typically the root, to other nodes in the list (L). In the process according to FIG. 4, note that the propagation of a dynamically inheritable attribute is made only to the file system entities associated with nodes in the list (L)—these are the file system entities having dm_gen values that do not match that of the root. This helps to reduce traffic and resource consumption associated with propagation of dynamically inheritable attributes, which can grow rapidly in a large distributed storage system.

After propagation of the value of the dynamically inheritable attribute to the file system entities associated with nodes in the list (L), the process of FIG. 4 exits (at 404).

Figure 5:
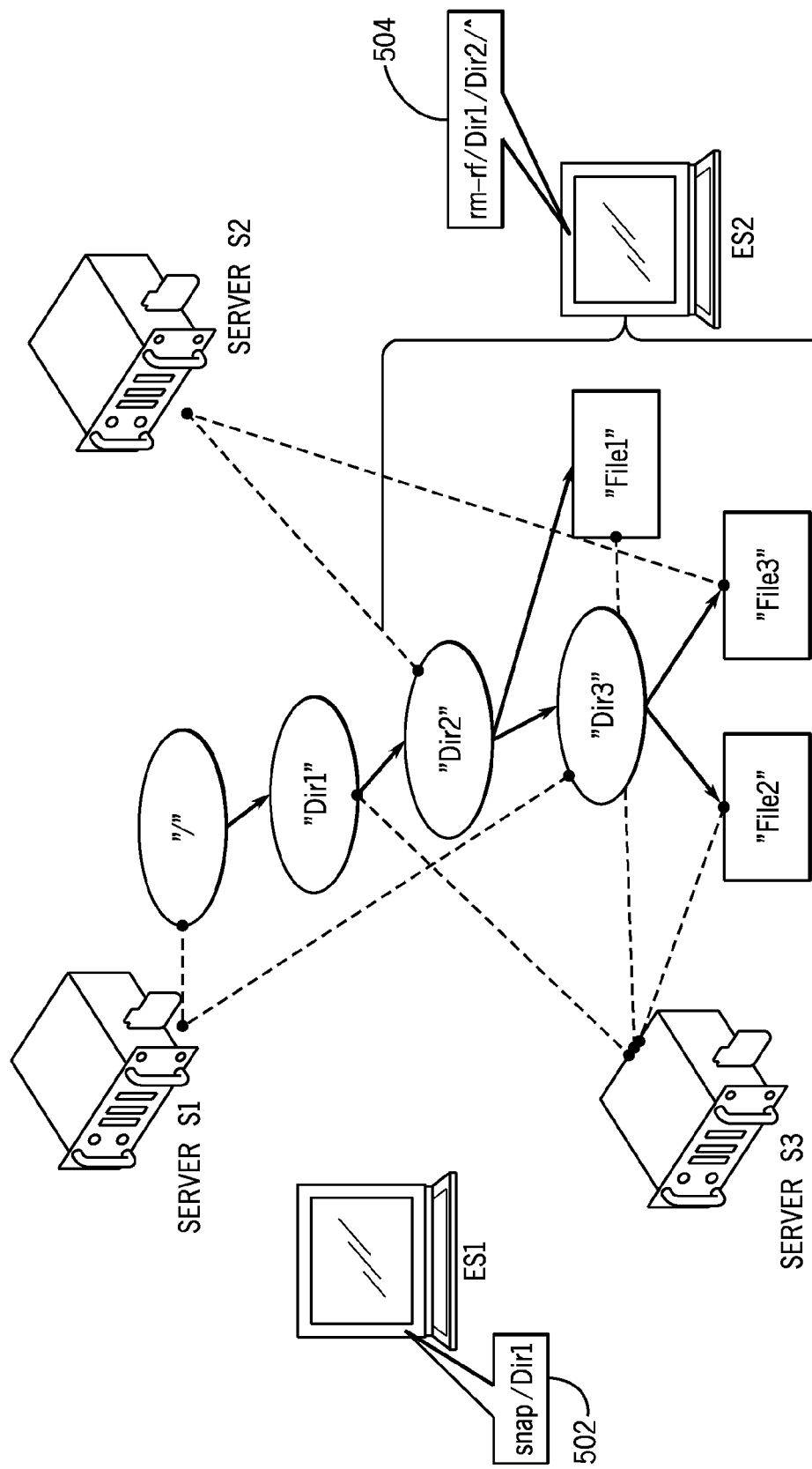

The following describes an example in the context of FIG. 5. In example FIG. 5, there are three files (File1, File2, and File3), three directories (Dir1, Dir2, and Dir3), and the file system root (/). The various file system entities shown in the example of FIG. 5 are managed by respective destination servers (S1, S2, and S3). A dashed line between a destination server and a respective file system entity in FIG. 5 indicates that the file system entity is being managed by the destination server. Thus, for example, the destination server S2 manages file system entities File3 and Dir2.

Also shown in FIG. 5 are two entry point servers (ES1 and ES2). File system operations, including snapshot operations, can be initiated at the entry point servers ES1 and ES2.

It is assumed in the beginning that the entry point server ES2 has worked with entities under /Dir2 for some amount of time and thus entities under /Dir2 are stored in the cache of the entry point server ES2. It is also assumed that a previous snapshot request was applied to the root (/) of the file system, and is associated with STM value STM_1. A snapshot of the root (/) is basically a snapshot of the entire file system under the root. All file system entities under the root (/) (such as those shown in FIG. 5) inherit the STM value STM_1 from the root. If a file system entity was created after the time indicated by STM_1 and is subsequently deleted (prior to another snapshot being taken), then such entity would not be preserved by the file system.

At a later point in time, the entry point server ES1 issues a snapshot request (502) to take a snapshot of Dir1. The snapshot of Dir1 is a request to preserve the state of Dir1 and all of the file system entities that are under Dir1. Note that the root (/) can have other sub-directories, and thus, the snapshot of Dir1 would be a snapshot of a subset of the data of the entire file system. The snapshot of Dir1 is associated with STM value STM_2, which is larger than STM_1.

Because STM_2 is larger than STM_1, the new value of STM_2 should be inherited by all file system objects under Dir1. As a result, file system entities that were created before STM_1 (as well as file system entities created after STM_1 but before STM_2) should be preserved in the snapshot at STM_2.

At this point, note that the dynamically inheritable attribute value STM_2, has not yet been propagated to the file system entities under Dir1.

In addition to changing the STM value at Dir1, the entry point server ES1 also requests a change of the dm_gen value at the root (/) due to the snapshot taken of Dir1. Since a new value of STM, STM_2, was recorded on Dir1 by the destination server S3 due to the snapshot taken of Dir1, the dm_gen field at the root would be incremented by destination server S1.

In addition, as a result of taking the snapshot at STM_2, invalidation requests are sent by destination servers S3 and S1 to entry point server ES2 to indicate that ES2 can no longer trust its local copy of the Dir1 and root "/" attributes, respectively. Only those file system entities (associated with Dir1 and /) cached at ES2 are invalidated. All other cached entities (e.g. Dir2, Dir3, File1, File2, and File3) are not affected by the invalidation requests sent to ES2.

If a subsequent file system operation involves use of the dynamically inheritable STM attribute, techniques or mechanisms ensure that the retrieved STM value is STM_2 and not STM_1. This is accomplished by performing propagating as described in connection with FIG. 3 or 4. The following describes an example of such a file system operation.

Such operation is an operation in response to a "rm -rf/ Dir1/Dir2/*" command (delete command) (504 in FIG. 5), issued by the entry point server ES2, to delete Dir2 and all entities below Dir2. However, because of the snapshot that was taken at STM_2 on Dir1, Dir2 and all file system entities under Dir2 should be preserved.

The first file system entity under Dir2 analyzed in response to the delete command is File3. The entry point server ES2 performs the process of FIG. 4 in response to the delete command. In the context of this example, the entry point server ES2 detects (at 402 in FIG. 4) that the root inode is not cached because it was updated when ES1 requested a snap at STM_2, and thus ES2 re-reads the root inode from destination server S1 (over a network). The File3 entity is cached at ES2 and can be trusted. However, the dm_gen value of File3 is different from the root's dm_gen that was retrieved at the latest update. As a consequence, the entry point server ES2 builds the list of nodes hierarchically that are in the chain from File3 to the root. Since all the nodes in the chain from File3 to the root have an old dm_gen value, different from that of the current dm_gen value of the root (updated due to the snapshot of Dir1 taken at 502), all nodes corresponding to file system entities in the chain from File3 to the root would be added to the list (L) built at 406, 408 in FIG. 4.

While building the list (L), ES2 detects that Dir1 is not cached, and thus ES2 re-reads Dir1 (from server S3). After the list (L) is built, the new STM value (STM_2) is propagated (410 in FIG. 4) to all file system entities corresponding to the nodes in the list (L). Also, the dm_gen fields of all such file system entities corresponding to the nodes in the list (L) are updated with the new dm_gen value of the root. Basically, the process of FIG. 4 detects that Dir1's STM value of STM_2 is larger than Dir2's STM value (STM_1) and uses STM_2 for all nodes below Dir1. In the example above, the entry point server ES2 performed two network requests to refresh "non-cached" nodes (to retrieve the root / and Dir1) and updated four in-core objects. At this point it can be seen that File3 was created before the current effective STM STM_2 and therefore has to be preserved.

The next file to be deleted in response to the delete command is File2. The entry point server ES2 enters the process of FIG. 4 again. This time both File2 and the root are cached in ES2, but the respective dm_gen values do not match. The list of nodes is built hierarchically from File2 to the root. However, this time the building of the list (L) stops very quickly after placing a single node Dir3 on the list because Dir3's dm_gen value matches the root's dm_gen value (due to the processing performed for File3 discussed above). This time no network requests are generated and only one in-memory node was updated. The same would happen in processing every other file system entity in the /Dir1/Dir2 sub-hierarchy in response to the example delete command (to delete Dir1) above.

In the example above, only two network requests were made to revalidate the STM of the root "/" and Dir1 entities, and to propagate the STM value down to all affected file system entities. This results in reduced network traffic and resource usage when validating the STM of file system entities that are the subject of a file system operation (which is the delete operation in the example discussed above).

As discussed above, a highly distributed file system environment is characterized by a wide distribution of file system entities that can be affected by a snapshot. These file system entities can be delegated to a potentially large number of entry point servers that may be actively working with the entities. "Delegating" a file system entity to an entry point server refers to a process where the file system entity is cached at the entry point server and may be subjected to modification at the entry point server.

Entry point servers can maintain write caches of data. When content of a write cache in an entry point server is modified, the write cache is considered dirty. Though each entry point server is constructed to flush dirty data in its write cache regularly, a significant amount of dirty cache content would typically exist on an entry point server. Flushing a write cache refers to writing content of the write cache to persistent storage, which can be a portion of the storage system maintained by a corresponding destination server.

The file system is designed to be resilient in the presence of problems in connectivity and can withstand long disconnects. It would be undesirable and impractical to force a system-wide flush of all cached data in entry point servers in response to each snap event that creates a new snapshot. Also, it would be undesirable to freeze the file system due to creation of a snapshot.

The write cache of an entry point server contains entries corresponding to write requests and respective write data. Also, in accordance with some implementations, an STM is associated with each entry of the write cache. By associating an STM with each entry of the write cache, a determination can be made regarding whether the write cache should be flushed in response to a write request.

Figure 6:
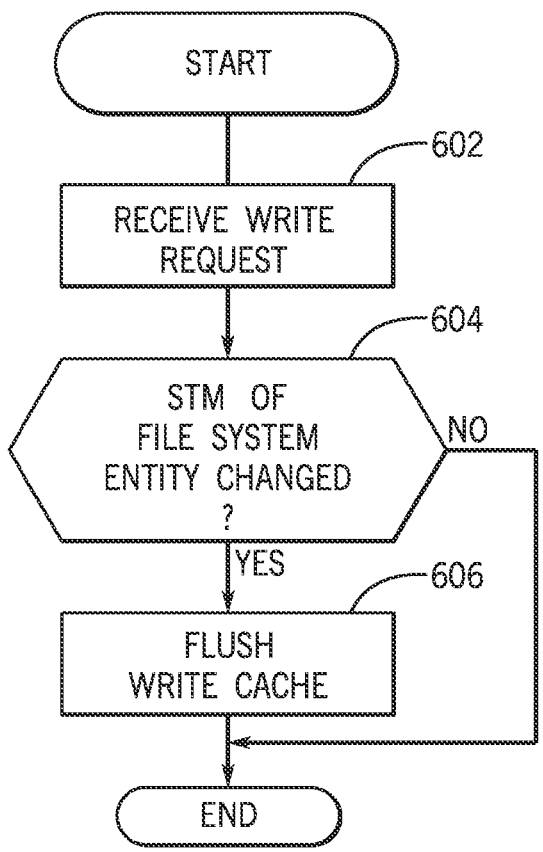

FIG. 6 shows write request processing at an entry point server according to some implementations. The write request is a request to write to the write cache of the entry point server. The write request includes an STM. The STM of the write request is compared to the STM of the corresponding entry of the write cache that is the target of the write request. If the STM is determined to have changed (at 604), then the entry point server flushes (at 606) the write cache. Flushing the write cache refers to writing back the dirty data in the write cache to the respective destination server(s). However, if the STM did not change (as determined at 604), then the write cache is not flushed.

In a highly distributed file system environment, a higher degree of parallelism can be achieved by treating directory operations that create, remove, or change names (of file system entities) as independent and isolated events that do not have to involve access of the actual objects (e.g. data) associated with the names. Techniques or mechanisms according to some implementations are provided to preserve the names of file system entities.

Snapshot relevant information, in the form of birth and death STMs, can be added to each name entry stored in directory files and recorded as a part of a directory name entry (DENTRY).

A birth STM is set to the effective STM dynamically inherited from the entity's predecessors at the time a name is created. When the file system processes operations that may remove the name, such as when an entity is being unlinked (removed) or renamed, and the current effective STM matches the birth STM, the directory name entry (DENTRY) can be removed from the directory. If the current effective STM is different from the birth STM, the directory name entry (DENTRY) is marked as "killed at effective STM" by setting a death STM.

A specific example regarding the use of a birth STM and a death STM is provided below. Assume a snapshot was requested on April 15. In response to this snapshot request, the respective STM is associated with the name of a particular file system entity that is the subject of the snapshot request on April 15. Assume that there was no other snapshot performed after April 15, and on April 17, a request is submitted to delete the particular file system entity. The particular file system entity can then be deleted without performing any preservation of the name of the particular file system entity.

On the other hand, assume that on April 16, a snapshot request was requested on a sub-tree that includes the particular file system entity. The STM is thus updated due to this subsequent snapshot request. Later, on April 17, a request is submitted to delete the particular file system entity. To preserve the name of the particular file system entity, the particular file system entity is marked as "killed at effective STM," which is the STM associated with the snapshot request on April 17. Also, a death STM is associated with the name of the particular file system entity.

Modifications of files themselves have no effect on names stored in directories. In reality such modifications may be treated as snapshot events or non-snapshot events. Most of the files are written once and are never updated in place. So, it may be beneficial to have the ability to preserve the naming part of the sub-tree and allow individual file updates to continue and be counted as pre-snapshot updates. For example, if someone is recording an 8 GB movie file for 2 hours, it may be beneficial for this movie file not to be preserved at an intermediate point in response to hourly snapshots. If a name is preserved by an effective snapshot request, all writes to that file may be allowed to be finished and be associated with the same snapshot request even if they continue past the time of the request. In this way, a partial version of the movie will not be seen—in other words, the system will see all or nothing of the movie.

On the other hand, when dealing with database files, continuous logs, and journals, it is desirable to coordinate snapshot requests with a stable state of such files. Integration with an architecture that provides a stable state of files allows an administrator to request snapshots and be automatically coordinated with application activity of the architecture. Without such coordination, an administrator has to guarantee that all relevant application activity is captured and files are in a stable state. Otherwise files may be preserved at intermediate transient states that have no or little value for restoration purposes.

Figure 7:
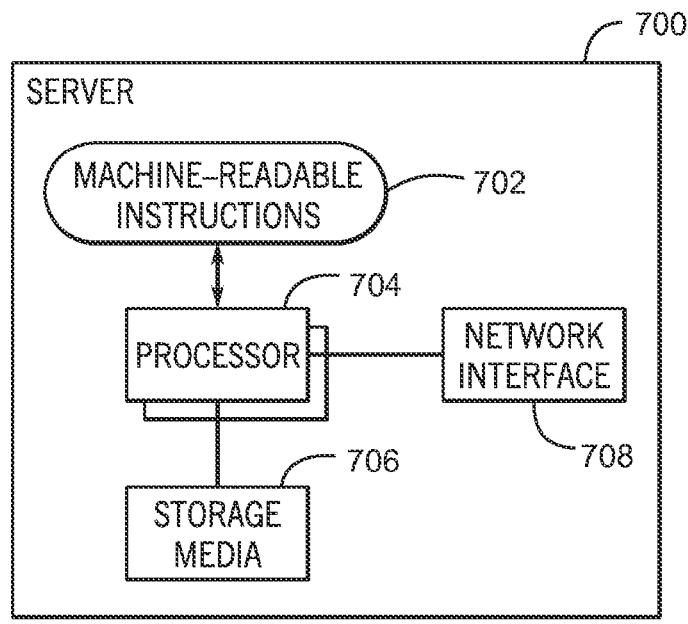
FIG. 7 is a block diagram of a server according to an example implementation.

FIG. 7 is a block diagram of an example server, which can be an entry point server or a destination server. The server 700 includes machine-readable instructions 702 executable on one or multiple processors 704. The processor(s) is (are) connected to machine-readable storage media 706, and to a network interface 708 that allows the server 700 to communicate over a network.

A processor can include a microprocessor, microcontroller, processor module or subsystem, programmable integrated circuit, programmable gate array, or another control or computing device.

The machine-readable (or computer-readable) storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

Figure 11:
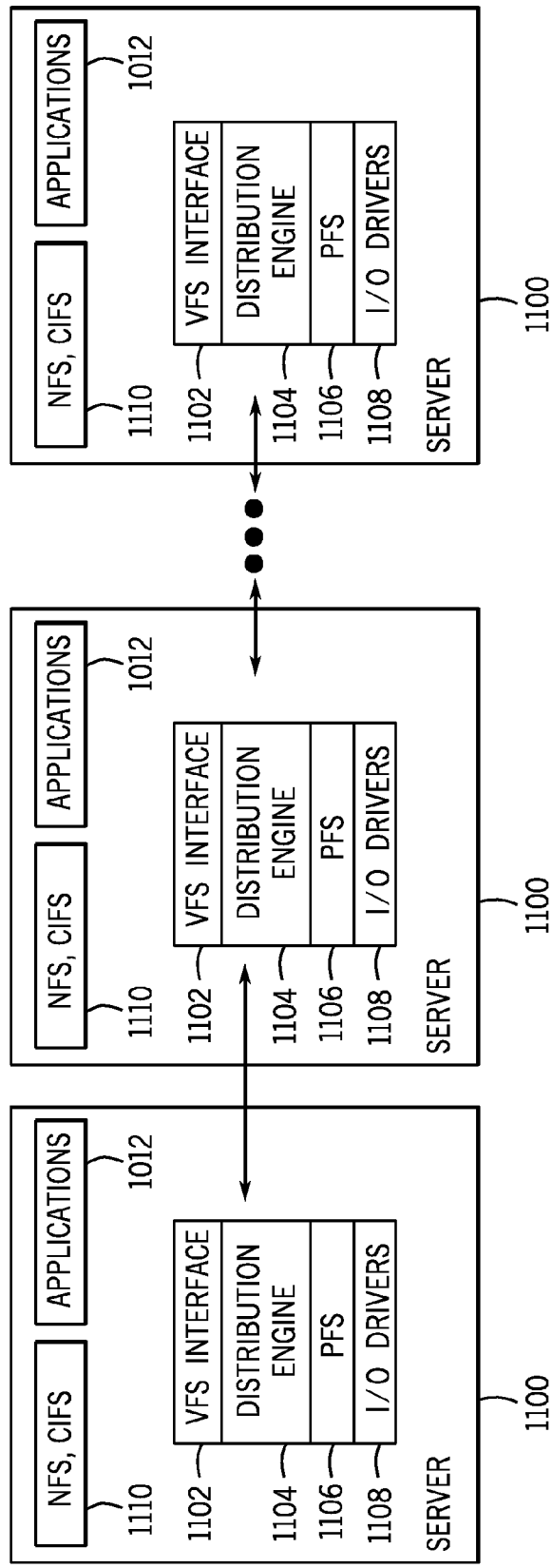
FIG. 11 is a block diagram of components in a distributed arrangement of servers, according to further examples.

FIG. 11 is a block diagram of example components of a distributed arrangement of servers 1100. Each of the servers 1100 includes applications 1012 that are executable in the respective servers 1100. In addition, each server 1100 includes a distributed file system 1110, such as a network file system (NFS) or common Internet file system (CIFS).

Each server 1100 also includes a stack that has a virtual file system (VFS) interface 1102, a distribution engine 1104, a physical file system (PFS) 1106, and input/output (I/O) drivers 1108. Other components not shown can also be part of the stack in each server 1100. Note also that the distributed file system 1110 can also considered to be part of the stack.

The VFS interface 1102 allows the applications 1012 to access different types of file systems. The physical file system 1106 in each server 1100 manages on-disk structures, performs in-memory caching of local file system entities, performs segment-level snapshots, and/or other tasks.

The distribution engine 1104 performs remote session management (with other servers), provides distributed cache coherence, performs load balancing migration, manages distributed snapshots, and/or other tasks.

As discussed above, each snapshot object includes names and files (inodes) that has an associated birth STM. In this regard, the birth STM may be assigned to a snapshot object when the object is created and is equal to the current applicable STM at that point.

When a particular snapshot object is removed, a current applicable STM is compared with the object's birth STM. If no new snapshots were requested in the affect part of the name space after the creation of the snapshot object, the birth STM is identical to the current applicable STM. Therefore, for this scenario, the snapshot object to be removed is not preserved, as the object is captured in a snapshot. However, if the associated snapshot is created after the creation of the object, the current applicable STM does not match the birth STM, as the current applicable STM is larger. In this case, the object is preserved.

For purposes of indicating that a particular snapshot object is to be preserved, a time marker called a "death STM," is assigned to the object. Any access to such a snapshot object at the current time filters out all objects that have an associated death STM. When the name space for any time in the past is constructed, all objects that were either not born at that time (i.e., the birth STM is larger than the query STM) are filtered, as well as objects that were removed by that time (i.e., the birth STM is less than or equal to the query STM).

Systems and techniques are disclosed herein for purposes of recreating the name space of the file system in an accelerated manner for an arbitrary restore time point that is within a requested restoration "rollback" period. In this manner, assuming that the name space of the file system evolves through time, at a particular point of time (called "$T_1$"), a user may request a snapshot to preserve the state of the name space. After time $T_1$, some changes may be made to the name space. Continuing the example, at time $T_2$, the user may request another snapshot. Later, at time $T_3$, the user may recognize that some changes are to be discarded and may request restoration of the name space to the state at time $T_1$. Therefore, a rollback period is created, as all objects that were created after time $T_1$ are to be discarded; all objects that were removed after time $T_1$ are to be revived; and all modifications to individual files are rolled back to the time $T_1$ restore point. One way to accomplish this is for a snapshot maintenance utility to traverse the name space and make the changes. However, the set of affected objects may be relatively large and such processing may consume a considerable amount of time.

Figure 8:
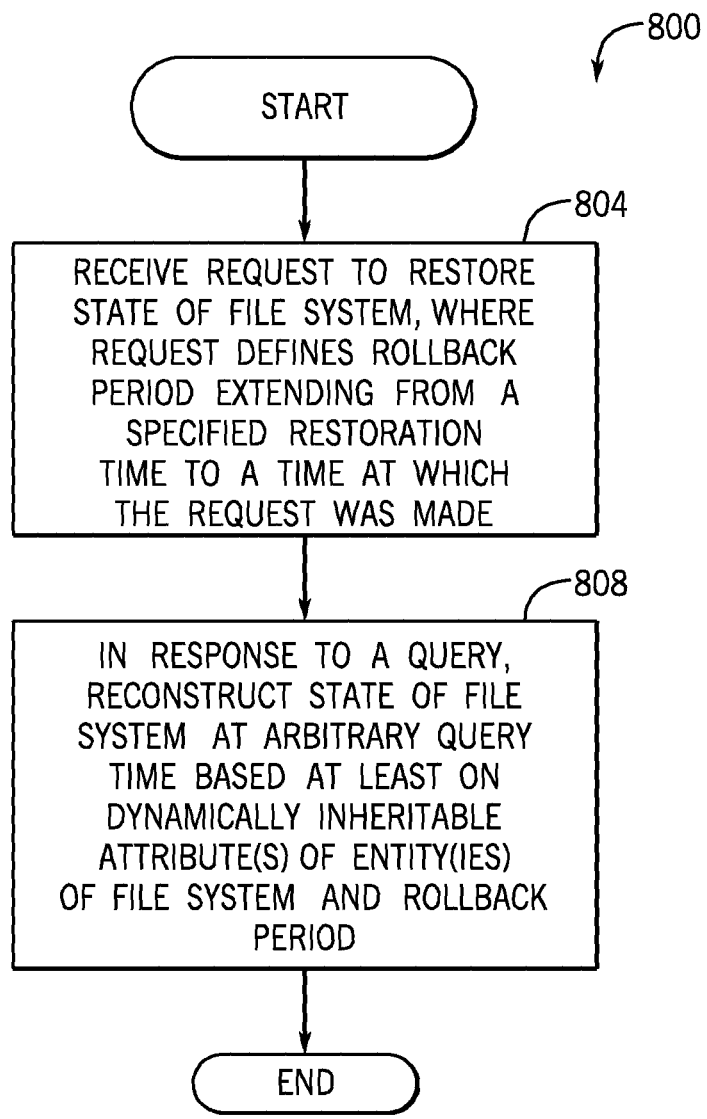
FIGS. 8, 9 and 10 are flow diagrams depicting techniques to reconstruct a state of a storage system according to example implementations.

Referring to FIG. 8, a technique 800 may be used, in accordance with an exemplary implementation, for purposes of reconstructing the state of a file system by determining on a per object basis for candidate objects whether the object should be filtered or not in response to a particular query. Pursuant to the technique 800, a request is received (block 804) to restore the state of the file system. The request defines a rollback period, which extends from a restoration time specified by the request to a time at which the request was made. In response to a subsequent query that occurs at a time within the rollback period, the state of the file system is reconstructed (block 808) at an arbitrary query time based at least in part on dynamically inheritable attributes of entities of the file system and the rollback period.

In this regard, a given query may potentially target one or more candidate objects of the file system. For example, a given query may be a directory query (as an example), which requests a particular directory tree structure, or the query may target a particular file. The targeted objects may or may not be included into the query result (i.e., may or may not be filtered), depending on the rollback period, the creation time of the object, any modification time to the object and whether or not the object was removed during the rollback period. These factors are taken into consideration for purposes of determining whether or not to filter a candidate object when responding to the query.

More specifically, for purposes of more efficiently preserving the name space during a rollback period, two time marks are employed: a current, or "now," time mark (herein called the "NTM"), which depicts the time when the restore was requested; and a restore time mark (RTM) which depicts the desired time at which the restoration begins. It is noted that the RTM, similar to the query time (QTM) may not match exactly the times of any actual snapshot requests.

Using the NTM and RTM values in addition to the recorded birth STM (BSTM) and death STM (DSTM), the file system kernel may filter out all objects that were created after the RTM and before the NTM, where (RTM<BSTM and BSTM<NTM) and revive all objects with a death STM in the same time interval.

Figure 9:
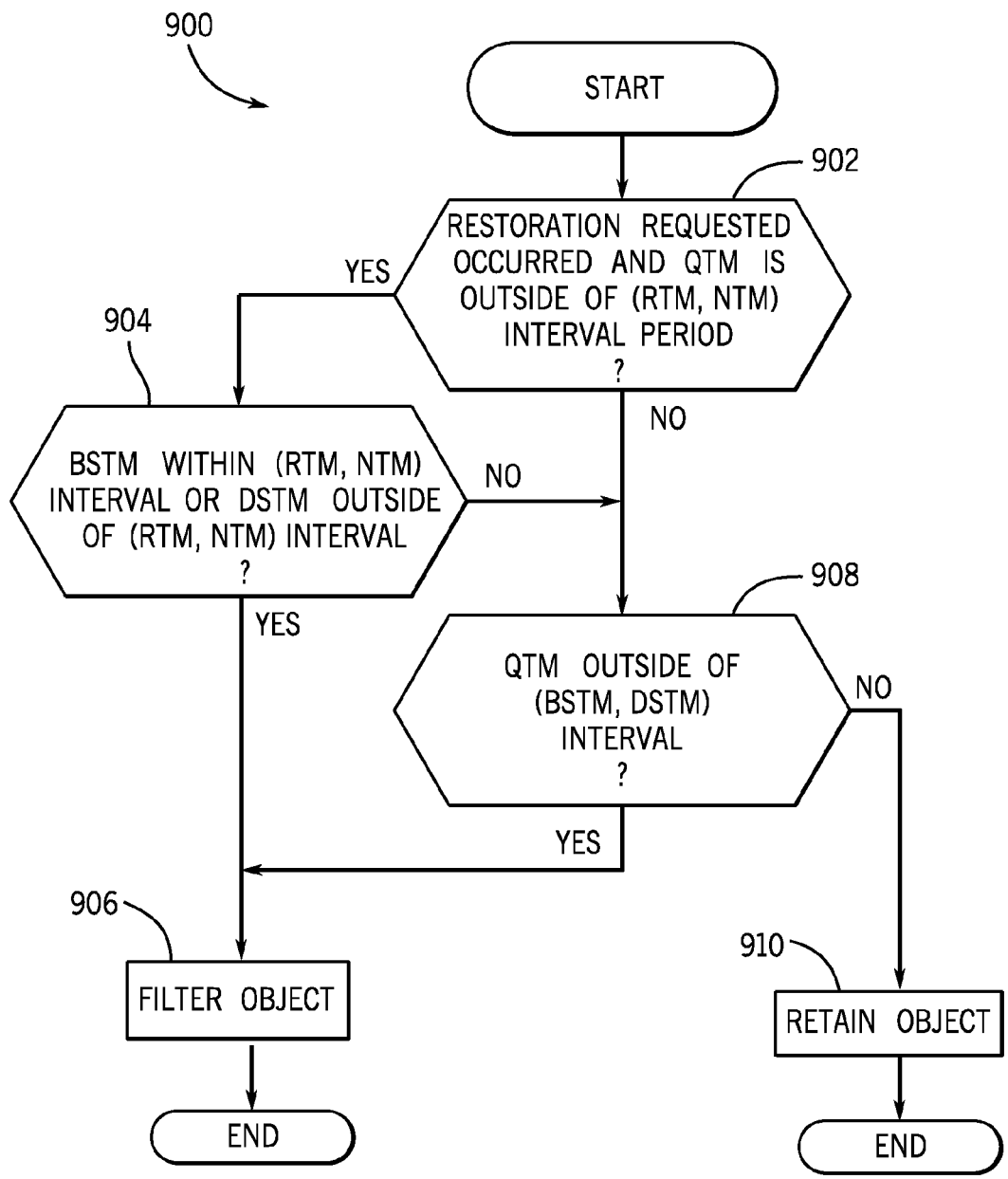

More particularly, referring to FIG. 9, in accordance with an example implementation, a technique 900 includes determining (decision block 902) whether restoration was requested and the query time (QTM) is outside of the (RTM, NTM) rollback period interval. If so, a determination is then made (decision block 904) whether the birth STM is within the (RTM, NTM) rollback period or whether the death STM is outside of the (RTM, NTM) rollback period. If so, then the object is filtered out, pursuant to block 906. Otherwise, if an applicable restoration request has not been made or the QTM query time is inside of the (RTM, NTM) interval, then a decision is made (decision block 908) whether the QTM is outside of the time interval defined by the birth STM and the death STM. If so, the object is filtered out, pursuant to block 906. Otherwise, the object is retained as the part of the query results, pursuant to block 910.

Thus, in addition to the techniques disclosed above, the file system kernel filters out objects having a non-zero death STM, as well as performs filtering in accordance with the technique 900. Multiple snapshot restoration requests may be processed as follows. For non-overlapping requests (i.e., where (NTM1, RTM1) and (NTM2, RTM2) where RTM2>NTM1) may be recorded and processed separately. In this manner, the storage system may keep track of several, separate rollback regions.

Figure 10:
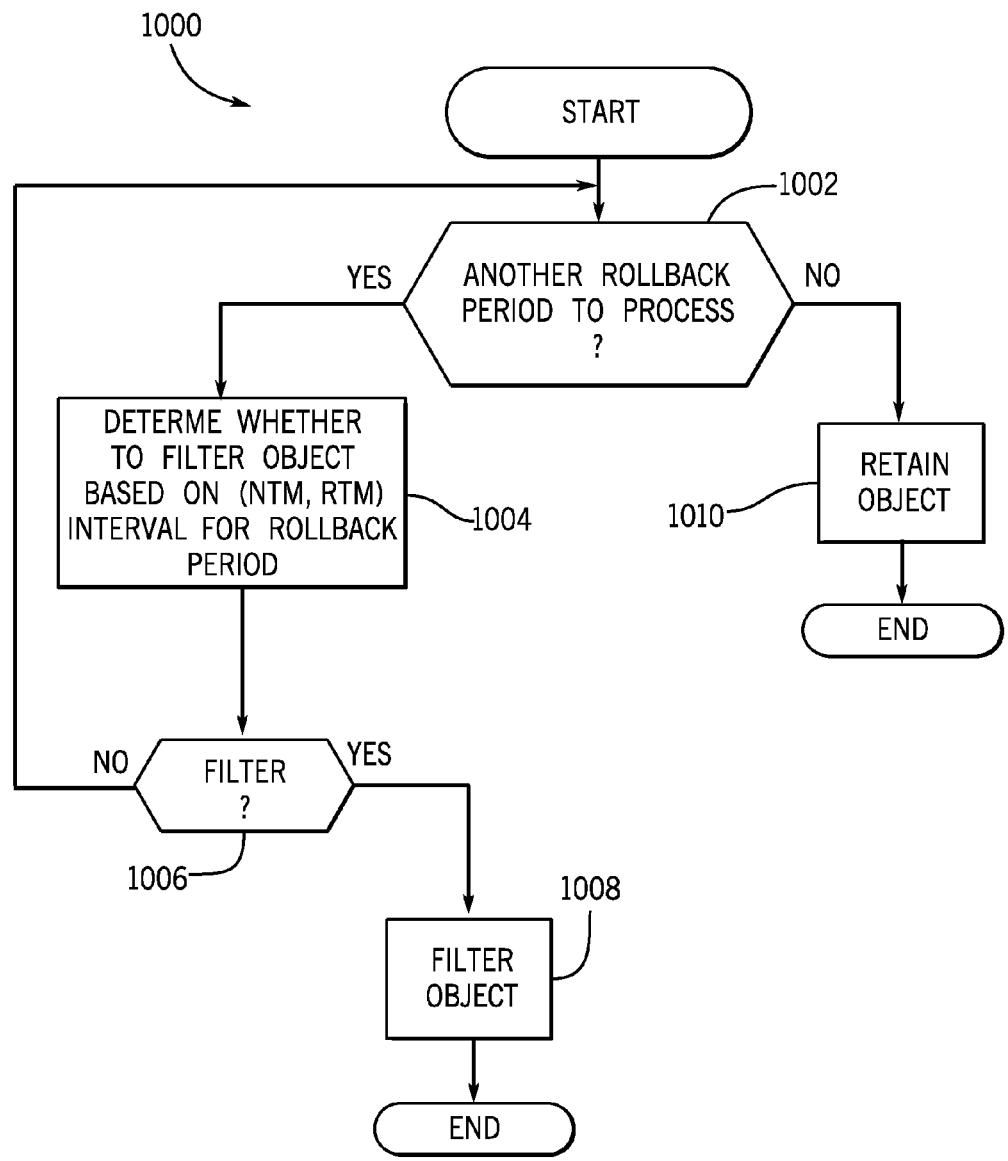

For a given query, the file system state may be reconstructed for applicable objects by processing each rollback period independently. In this manner, referring to FIG. 10, in accordance with an example implementation, a technique 1000 includes determining (decision block 1002) whether another restore period is to be processed for the targeted objects. The rollback periods are then analyzed to see if a given object is to be filtered for any of these regions. In this manner, the technique 1000 includes determining (block 1004) whether to filter the object based on the (NTM, RTM) rollback period. If a decision is made (pursuant to decision block 1006) to filter the object, then the object is filtered, pursuant to block 1008. Otherwise, after all of the regions have been processed and no decision has been made to filter the object, the object is retained, pursuant to block 1010.

In accordance with example implementations, a limit may be placed on how many non-overlapping requests may be supported until a clean up utility releases discarded entries and associated restore slots.

In accordance with example implementations, the above-described selective filtering for rollback periods that overlap each other in time may be processed similarly to the processing of non-overlapping requests, as disclosed above. However, in accordance with further implementations, for reasons of efficiency, overlapping rollback periods may be consolidated. For example, if two rollback periods that are defined by time intervals {NTM1, RTM1} and {NTM2, RTM2} are applied to the same object and RTM2<NTM1, then the filtering may alternatively consider the following consolidated rollback period: {NTM1, MIN(RTM1, RTM2)}. If several non-overlapping rollback periods are recorded and another rollback period overlaps both of them, the several rollback periods may be collapsed into one. Thus, operational ability to request multiple rollback periods may be traded for potential temporary ability to see the history between restores, in accordance with example implementations.

It is noted that the SMTs are to be applied at any point of the name space at any time. This mechanism of dynamic inheritance allows the synthesis of an effective STM and therefore, the determination if the change of a specific object is to be preserved or discarded. Similarly, the same mechanism may be applied to allow synthesizing multiple restore requests by aggregating the requests into one list. For reasons of efficiency, the overlapping requests may be collapsed, as set forth above.

In difference to STMs where there is only one applicable value and synthesizing rule assumes selecting the latest (largest) value, multiple regions of snapshot restores are generally recorded individually. A number of slots that are available for this purpose may be limited, in accordance with example implementations.

While a limited number of examples have been disclosed herein, those skilled in the art, having the benefit of this disclosure, will appreciate numerous modifications and variations therefrom. It is intended that the appended claims cover all such modifications and variations.

What is claimed is:

1. A method comprising:
   storing entities of a hierarchically arranged distributed file system in a storage system;
   at run-time of the file system, setting a value of a dynamically inheritable attribute of a particular entity of the entities, wherein the dynamically inheritable attribute relates to a preserved snapshot of the file system;
   receiving a request to restore a state of the file system, the request defining a rollback period extending from a restoration time specified by the request to a time at which the request was made; and
   in response to a query for the particular entity,
      reconstructing a state of the file system at an arbitrary query time using the preserved snapshot and based at least in part on the dynamically inheritable attribute and the rollback period,
      determining whether a timing marker for the query indicates a time within the rollback period, and
      selectively filtering out the particular entity from results for the query based at least in part on the determining and the dynamically inheritable attribute.

2. The method of claim 1, wherein the reconstructing includes filtering the particular entity based at least in part on whether the particular entity was created after the restoration time.

3. The method of claim 1, wherein the reconstructing includes reviving the particular entity based at least in part on whether the particular entity was removed from the file system.

4. The method of claim 1, wherein the reconstructing includes rolling back a modification to the particular entity based at least in part on whether the particular entity was modified after the restoration time.

5. The method of claim 1,
   wherein the selectively filtering out the particular entity from results of the query is in response to determining that the timing marker for the query indicates a time within the rollback period and the dynamically inheritable attribute indicating that the particular entity was created during the rollback period.

6. The method of claim 1,
   wherein the selectively filtering out the particular entity from results of the query is in response to determining that the timing marker for the query indicates a time within the rollback period and the dynamically inheritable attribute indicating that the particular entity was removed outside of the rollback period.

7. The method of claim 1, further comprising:
   receiving at least one additional request to restore a state of the file system, the at least one additional request defining at least one additional rollback period,
   wherein reconstructing the state is further based at least in part on the at least one additional rollback period.

8. The method of claim 7, wherein reconstructing the state further includes determining whether to filter the particular entity based on one of the rollback periods, independently determining whether to filter the particular entity based on another one of the rollback period, and selectively filtering the particular entity based at least in part on the determinations involving the one and the at least one other rollback periods.

9. A distributed storage system comprising:
   a plurality of segment servers to manage respective segments of file system entities of a distributed file system, each entity of the file system entities being associated with a dynamically inheritable attribute related to a snapshot of the file system;
   an entry point server to submit requests to access the distributed file system, the entry point server to:
      receive a request to restore a state of the file system, the request defining a rollback period extending from a restoration time specified by the request to a time at which the request was made, and
      in response to a query,
         reconstruct a state of the file system at an arbitrary query time using the snapshot and based at least in part on the dynamically inheritable attributes and the rollback period, determine a determination of whether a timing marker for the query indicates a time within the rollback period, and selectively filter out an entity stored on the file system from results for the query based at least in part on a dynamically inheritable attribute of the entity and the determination.

10. The distributed storage system of claim 9, wherein the dynamically inheritable attribute includes a timing marker indicative of a time at which the entity was created.

11. The distributed storage system of claim 9, wherein the dynamically inheritable attribute includes a timing marker indicative of a time at which the entity was removed from the file system.

12. The distributed storage system of claim 9, wherein the server is to determine whether a timing marker for the query indicates a time within a time interval defined by a timing marker indicative of the time at which the query was made and a timing marker indicative of the restoration time.

13. The distributed storage system of claim 9, wherein the server is to determine whether a timing marker for the request indicates a time within a time interval defined by a timing marker indicative of the time at which the request occurs and a timing marker indicative of the time for the restore operation indicated by the request.

14. The distributed storage system of claim 9, wherein the dynamically inheritable attribute includes a time property associated with snapshots, wherein the time property increases in value with each snapshot created in the file system.

15. An article comprising a non-transitory storage medium storing instructions that when executed by a processor-based system cause a distributed storage system to:

in response to a restore request at a first time, restore entities of the distributed storage system based on a snapshot of the entities associated with a second time;

receive a request to restore a state of a file system, the request defining a rollback period extending from a restoration time specified by the request to a time at which the request was made; and in response to a query to the file system, reconstruct a state of the file system at an arbitrary query time based at least in part on a dynamically inheritable attribute of an entity stored on the file system and the rollback period, determine a determination of whether a timing marker for the query indicates a time within the rollback period, and selectively filter out the entity based at least in part on the determination and the dynamically inheritable attribute.

16. The article of claim 15, wherein the dynamically inheritable attribute includes a timing marker indicative of a time at which the entity was created on the storage system.

17. The article of claim 15, wherein the dynamically inheritable attribute includes a timing marker indicative of a time at which the entity was removed from the storage system.

18. The article of claim 15, the storage medium storing instructions that when executed by the processor-based system cause the processor-based system to determine whether a timing marker for the query indicates a time within a time interval defined by a timing marker indicative of the time at which the query was made and a timing marker indicative of the restoration time.

19. The article of claim 15, the storage medium storing instructions that when executed by the processor-based system cause the processor-based system to determine whether a timing marker for the request indicates a time within a time interval defined by a timing marker indicative of the time at which the request occurs and a timing marker indicative of the time for the restore operation indicated by the request.

20. The method of claim 1, wherein the selectively filtering out the particular entity from results of the query is in response to determining that the timing marker for the query indicates a time outside of the rollback period and the timing marker for the query being outside a time period defined, based on the dynamically inheritable attribute, from a time at which the particular entity was created to a time at which the particular entity was removed.

21. The distributed storage system of claim 9, wherein the entry point server is to:

selectively filter out the entity from results for the query in response to the determination being that the timing marker for the query indicates a time within the rollback period and the dynamically inheritable attribute of the entity indicating that the entity was created during the rollback period, and selectively filter out the entity from results for the query in response to the determination being that the timing marker for the query indicates a time within the rollback period and the dynamically inheritable attribute of the entity indicating that the entity was removed outside of the rollback period.

* * * * *